UNITED STATES PATENT OFFICE.

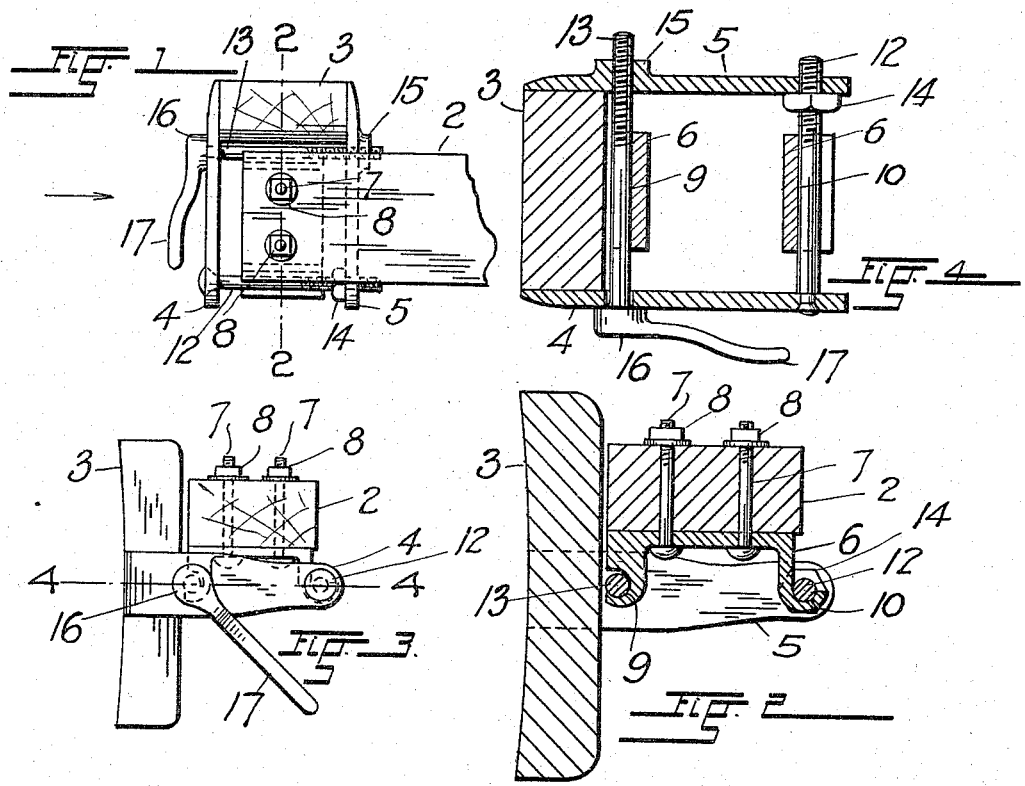

AUGUST F. BEHRMAN, OF BUENA VISTA, COLORADO.

BRAKE-SHOE HOLDER.

1,186,538.

Specification of Letters Patent. Patented June 13, 1916.

Application filed January 22, 1915. Serial No. 3,827.

*To all whom it may concern:*

Be it known that I, AUGUST F. BEHRMAN, citizen of the United States, residing at Buena Vista, in the county of Chaffee and State of Colorado, have invented certain new and useful Improvements in Brake-Shoe Holders, of which the following is a specification.

This invention relates to improvements in brake shoe holders, and its object resides in the provision of a device of this character which combines simplicity in construction with practicability in use, and by means of which brake shoes of different size and form may be readily secured in their operative position with relation to a brake bar, without any fastening device other than those comprised in the construction of the holder.

My improved holder is particularly adapted for use on wooden brake beams of farm and lumber wagons and other heavy vehicles.

In the accompanying drawings in the various views of which like parts are similarly designated, Figure 1 represents a plan view of the end of a brake beam to which the shoe is attached by means of a holder constructed in accordance with my invention, Fig. 2, a section taken along the line 2—2, Fig. 1, Fig. 3, an end view of the beam shown in Fig. 1, looking in the direction of the arrow, and Fig. 4, a section taken along the line 4—4, Fig. 3.

Referring more specifically to the drawings, the reference numeral 2 designates the end of an ordinary wooden brake beam, and 3 the shoe or block which is secured thereto by means of my improved holder. The holder consists of a clamp comprising a pair of relatively adjustable jaws 4 and 5 between which in practice the shoe is positioned. The clamp is mounted upon a bracket 6 which by means of bolts 7 and nuts 8 is fixedly secured against an upright face of the brake beam at or adjacent an end of the same. This bracket is provided at its ends with two bolt seats 9 and 10, formed by recurving the extreme ends of its end portions which are bent at right angles to its body portion engaging the face of the beam. Movably supported in these seats are two bolts 12 and 13 which adjacent their opposite ends, support the two clamping members. The rear bolt 12 is secured at its head-end against rotation in an opening of the outer member which is disposed beyond the end of the beam, and its opposite threaded portion projects loosely through an opening in the other member. A nut 14 on the bolt engages the inner surface of the last-mentioned member to limit the inward movement of the same. The other bolt 13 which is positioned foremost with relation to the front surface of the beam, projects loosely through an opening in the outer clamping member 4 and its threaded end-portion extends into a coöperatively threaded enlargement 15 of the member 5. The head 16 of the bolt which engages the exterior surface of the outer clamping member, has a laterally extending tail 17 which provides a hand lever for use in turning the bolt for securing the shoe placed between the two members, by drawing the latter in engagement therewith.

The holes in the two members through which the bolts extend, are formed respectively adjacent the rear ends of the members for the reception of the bolt 12 and at a distance from their opposite ends to receive the tightening bolts 13 and the portions of the members which extend beyond the foremost bolt when the parts are assembled, provide the coöperative jaws between which in practice, the brake shoe is disposed.

To apply a shoe of suitable size and form to the brake beam, the nut on the bolt 12 is adjusted to limit the inward movement of the member 5 to the required distance from its correlative. After the tightening bolt 13 has been loosened, the shoe is placed between the jaws of the clamping members and the latter are then drawn together to clampingly engage the shoe, by screwing the bolt into the threaded enlargement 15 of the member 5 and against the exterior surface of the member 4.

Having thus described my improved holder in the best form at present known to me, I desire it understood that variations in the construction and arrangement of its parts, may be resorted to within the spirit of my invention as defined in the following claims.

1. A brake-shoe holder comprising a pair of clamping members relatively disposed to engage opposite sides of a brake-shoe placed between them, a bolt supporting said members adjacent one of their ends, a tightening-bolt connected with the members for drawing them together, and a bracket adapted to be secured to a brake bar, and having seats for the support of said bolts.

2. A brake-shoe holder comprising a pair of clamping members relatively disposed to engage opposite sides of a brake-shoe placed between them, a bolt supporting said members adjacent one of their ends, a tightening-bolt connected with the members for drawing them together, and a bracket adapted to be secured to a brake bar, and having its end-portions bent in angular relation to its middle portion, and recurved to provide seats for the support of said bolts.

3. A brake-shoe holder comprising a pair of clamping members relatively disposed to engage opposite sides of a brake-shoe placed between them, at one of their ends, a bolt supporting said members adjacent their opposite ends, a tightening-bolt connected with the members at points intermediate of their ends, for drawing them together, and a bracket adapted to be secured to a brake bar, and having seats for the support of said bolts.

4. A brake shoe holder comprising a pair of clamping members adapted to engage at one of their ends, opposite sides of a brake-shoe placed between them, an element adapted to be attached to a brake bar, a tightening bolt connected with the members for drawing them together, and an appliance for limiting the adjustment of said members by action of the tightening bolt, the said bolts and said appliance being mounted upon said element to movably connect the clamping members with the brake-bar.

5. A brake-shoe holder comprising a pair of clamping members adapted to engage at one of their ends, opposite sides of a brake-shoe placed between them, an element adapted to be attached to a brake bar, a tightening bolt connected with the members for drawing them together, a bolt fixed at the opposite end of one of said members and extending loosely through an opening in the corresponding end of the other member, and a nut on said bolt engaging the inner surface of the other member, the said bolts being mounted upon said element to movably connect the clamping members with the brake-bar.

6. The combination with a brake beam, of a brake-shoe holder consisting of a pair of clamping members adapted to engage at one of their ends opposite sides of a brake-shoe placed between them, a device at the opposite ends of said members for determining the distance between them, and a device for drawing the members together, and means coöperating with the last-mentioned device for connecting the said brake-shoe holder at an end of the said beam.

In testimony whereof I have affixed my signature in presence of two witnesses.

AUGUST F. BEHRMAN.

Witnesses:
H. J. van Wetering,
Edward Krueger.

Copies of this patent may be obtained for five cents each, by addressing the "Commissioner of Patents, Washington, D. C."